(12) United States Patent
Harada et al.

(10) Patent No.: US 9,897,232 B2
(45) Date of Patent: Feb. 20, 2018

(54) MOTOR-DRIVEN VALVE (71) Applicant: FUJIKOKI CORPORATION, Setagaya-ku, Tokyo (JP)

(72) Inventors: Takao Harada, Tokyo (JP); Kensuke Tabuchi, Tokyo (JP); Teppei Asano, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 30 days.

(21) Appl. No.: 15/139,399

(22) Filed: Apr. 27, 2016

(65) Prior Publication Data

US 2016/0341336 A1    Nov. 24, 2016

(30) Foreign Application Priority Data

May 18, 2015   (JP) ................................. 2015-101325

(51) Int. Cl.
| | | |
|---|---|---|
| F16K 47/14 | (2006.01) | |
| F16K 47/02 | (2006.01) | |
| F16K 31/04 | (2006.01) | |
| F25B 41/06 | (2006.01) | |

(52) U.S. Cl.
CPC ............ *F16K 47/14* (2013.01); *F16K 31/047* (2013.01); *F16K 47/02* (2013.01); *F25B 41/062* (2013.01); *F25B 2341/061* (2013.01); *F25B 2341/0653* (2013.01); *F25B 2500/12* (2013.01); *Y02B 30/72* (2013.01)

(58) Field of Classification Search
CPC .......... F16K 31/04; F16K 47/02; F16K 47/14; F25B 41/062; F25B 2341/061; F25B 2341/0653; F25B 2500/12; Y02B 30/72
See application file for complete search history.

(56) References Cited

U.S. PATENT DOCUMENTS

| 2,644,389 | A | * | 7/1953 | Dauphinee | ............. | F24F 13/06 |
|---|---|---|---|---|---|---|
| | | | | | | 181/224 |
| 4,479,509 | A | * | 10/1984 | Dear | ....................... | F16K 47/02 |
| | | | | | | 251/122 |
| 5,006,235 | A | * | 4/1991 | Cooper | ................ | B01D 29/232 |
| | | | | | | 210/136 |
| 6,105,614 | A | * | 8/2000 | Bohaychuk | ............. | F16K 47/08 |
| | | | | | | 251/118 |
| 2012/0248355 | A1 | * | 10/2012 | Harada | ................... | F16K 31/04 |
| | | | | | | 251/129.11 |

FOREIGN PATENT DOCUMENTS

| EP | 0072169 | 2/1983 |
|---|---|---|
| EP | 2924373 | 9/2015 |
| JP | 09-310939 | 2/1997 |

(Continued)

OTHER PUBLICATIONS

European Search Report for co-pending European Application No. 16162882, dated Oct. 4, 2016, 3 Pages.

*Primary Examiner* — Eric Keasel
(74) *Attorney, Agent, or Firm* — McCarter & English, LLP (57) ABSTRACT

Provided is a motor-driven valve with a simple configuration that is capable of suppressing flow rate loss of fluid and reducing noise caused by the flow of the fluid in the first flowing direction and the second flowing direction, without greatly changing a conventional motor-driving valve. A porous body is fixed to a valve seat member, the porous body being extended at least to be lateral to a valve port and having a cutout part corresponding to a first opening provided at a lateral part of a valve body.

12 Claims, 5 Drawing Sheets

(56) References Cited

FOREIGN PATENT DOCUMENTS

| | | |
|---|---|---|
| JP | 2002-235969 | 8/2002 |
| JP | 2004028195 | 1/2004 |
| JP | 2013-130271 | 7/2013 |

* cited by examiner

(Prior Art)

Fig. 5

MOTOR-DRIVEN VALVE

CROSS-REFERENCE TO RELATED APPLICATIONS

This application claims the benefit of Japanese Patent Application No. 2015-101325 filed on May 18, 2015, the entire content of which is incorporated herein by reference.

FIELD OF THE INVENTION

The present invention relates to motor-driven valves, and relates to a motor-driven valve used for a heat-pump type heating and cooling system, for example.

BACKGROUND OF THE INVENTION

Conventionally the development of motor-driven valves having a smaller size, larger capacity and more energy efficient has been promoted. As one example of such a conventional motor-driven valve, a technology is disclosed at JP 2013-130271A, making it possible to include a valve opening spring with a small spring load by minimizing the force acting in the valve-closing direction.

The motor-driven valve disclosed in JP 2013-130271A includes: a valve body having a valve chamber, a horizontal first inlet-outlet port that opens on the valve chamber, a vertical valve port with a valve seat that opens on the valve chamber, and a second input-outlet port connected to the valve port; a valve element that is disposed in the valve chamber in a vertically ascendable/descendable manner so as to open/close the valve port; vertically driving means having an electric motor to make the valve element ascend/descend; and a valve opening spring to bias the valve element in the valve opening direction. The diameter of the valve port and the diameter of a back pressure chamber defined above the valve element are substantially the same, a pressure equalizing path is provided in the valve element, having a lower end face that opens so as to allow the valve port and the back pressure chamber to communicate, and the components of the valve have dimensions so that the value obtained by dividing the area of the lower end opening of the pressure equalizing path by the area of the valve port is within a predetermined range.

Figure 4:
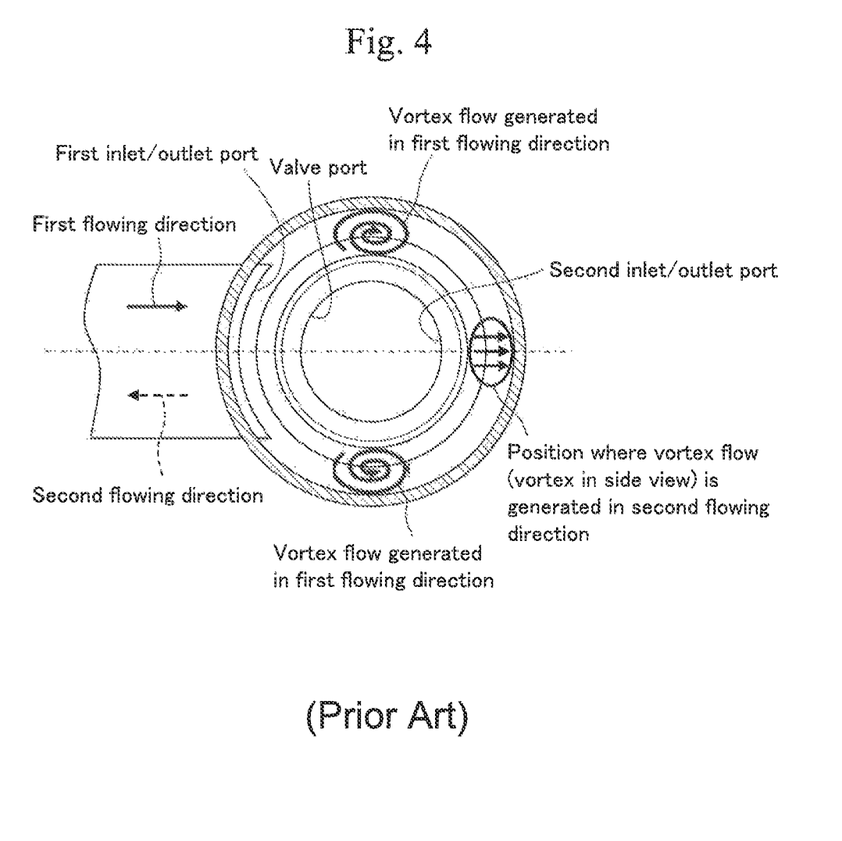
FIG. 4 shows a position where a vortex flow occurs in a conventional motor-driven valve when the valve is opened.
Figure 5:
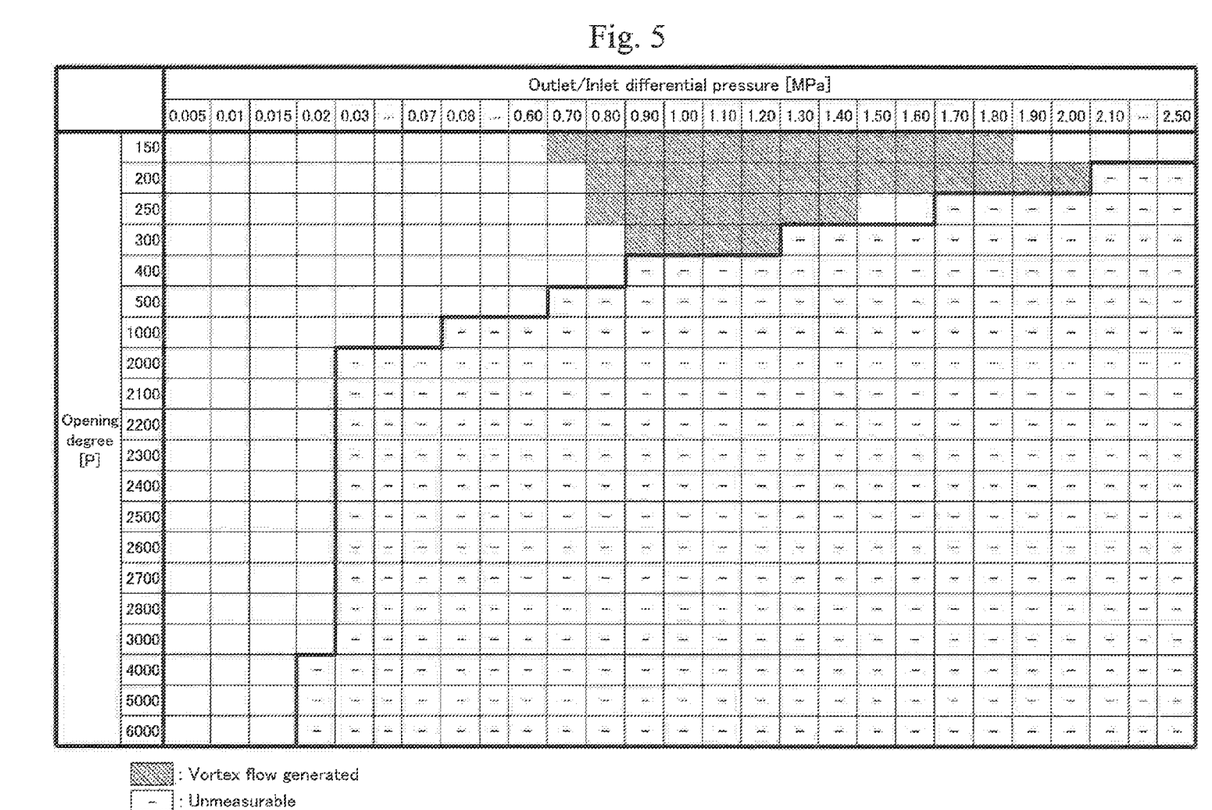
FIG. 5 shows the experimental result on the measurement of occurrence or not of a vortex flow when the conventional motor-driven valve is opened.

In this type of motor-driven valves, fluid (refrigerant) flows in two directions including a first flowing direction from the first inlet-outlet port to the second inlet-outlet port and a second flowing direction from the second inlet-outlet port to the first inlet-outlet port. If refrigerant as gas (gas refrigerant) flows in the first flowing direction in a gas-excessive state, for example, there is a problem that a periodical vortex flow occurs in the vicinity of the region between the lateral part of the valve port and the inner wall face of the valve body when the valve chamber is viewed from the first inlet-outlet port, and noise is generated accordingly. If refrigerant flows in the second flowing direction in a gas-excessive state, for example, there is a problem that a periodical vortex flow occurs in the vicinity of the region between the part of the valve port on the opposite side of the first inlet-outlet port and the inner wall face of the valve body (especially in a region close to the valve port in that region), and noise is generated accordingly (see FIG. 4). Specifically, the experiment by the present inventors showed that, if refrigerant flows in the first flowing direction in a gas-excessive state, the above-mentioned periodical vortex flow occurs at a high differential pressure and with a very small opening degree of the valve (see FIG. 5).

Conventionally such noise during operation has been a concern for various types of valve devices, and so JP H09-310939A and JP 2002-235969A disclose prior art to suppress noise of an expansion valve or a dry valve used in a refrigerating cycle.

The expansion valve disclosed in JP H09-310939A includes a valve body having openings at the lateral face and the lower face as well as a space inside, a valve element and a valve seat defining a throttle inside of the valve body, a shaft coupled with the valve body and having a rotor at an upper part thereof, a case surrounding the shaft and the rotor, a stator located at the outer circumference of the rotor, supporting means that supports the valve element and the shaft, and a first pipe connected to the opening at the lateral face of the valve body and a second pipe connected to the opening at the lower face of the valve body. Such an expansion valve includes a hollow rectifier located inside of the valve body that has one end fixed to the valve body and the other end fixed to the supporting means, and has a plurality of through holes at the lateral face thereof.

The dry valve disclosed in JP 2002-235969A is provided with a path around the valve seat so as to allow a valve chamber and a valve outlet port to communicate when the valve is closed, and includes a throttle made of a porous body in this path and an elastic member located close to a valve stem of the dry valve so that the elastic member comes into contact with the porous body when the valve is closed, wherein this elastic member functions as a valve element and this porous body functions as a valve seat.

The prior art disclosed in JP H09-310939A, however, has the following problems. That is, refrigerant flowing into through the first pipe comes around the space defined by the valve body and the rectifier, flows into the space storing the valve element through the plurality of through holes formed at the rectifier, and passes through the throttle defined by the valve element and the valve seat to flow into the second pipe. Therefore although noise can be reduced by suppressing vibrations of the valve element and the case due to fluctuations in pressure caused by the non-uniform state of the refrigerant, other problems occur, such as an increase in flow rate loss of the refrigerant or the complicated arrangement and configuration of the rectifier.

The prior art disclosed in JP 2002-235969A has the following problems. This technique has the effect of reducing discontinuous sound and so lead to the sound deadening effect because the refrigerant is rectified when it passes through the porous body and even when a gas-liquid two-phase flow generating the sound of refrigerant flow the most remarkably flows, this gas-liquid two-phase flow is homogenized and the pressure is reduced in this homogenized state. However, other problems occur, such as a large flow rate loss of the refrigerant and the necessity for the porous body to function as a valve seat.

SUMMARY OF THE INVENTION

In view of these problems, the present invention aims to provide a motor-driven valve with a simple configuration that is capable of suppressing flow rate loss of fluid and reducing noise caused by the flow of the fluid in the first flowing direction and the second flowing direction, without greatly changing a conventional motor-driving valve.

As a result of a further study, the present inventors found that vortex flow prevention means including a porous body that is disposed in a region including a part lateral to the valve port can reduce noise at a motor-driven valve due to fluid flowing in the first flowing direction and in the second flowing direction effectively.

That is, in order to solve the above problems, a motor-driven valve of the present invention includes: a valve body 5 having a valve chamber defined internally, and having a lateral part and a bottom part in which a first opening and a second opening are disposed, respectively; a valve seat member having a valve port that opens on the valve chamber and a valve seat, the valve seat member being disposed at the second opening of the valve body; a valve element disposed in a vertically ascendable/descendable manner in the valve chamber; and a vertically driving unit that makes the valve element ascend/descend with respect to the valve seat. A porous body is fixed to the valve seat member, the porous body being extended at least to be lateral to the valve port and having a cutout part corresponding to the first opening.

In a preferable embodiment, a cylindrical holding member is fixed to the valve body, the cylindrical holding member having a sleeve part that slidably holds the valve element that is internally fitted to the sleeve part and partly penetrates from the sleeve part, and the porous body is extended to a position that is lateral to the sleeve part of the cylindrical holding member and below a ceiling face of the valve chamber of the valve body.

In another preferable embodiment, the porous body is disposed having a distance from the sleeve part of the cylindrical holding member.

Preferably the porous body includes at least one of a mesh member prepared by weaving wire to be netlike, a laminate including the layer of a plurality of the mesh members, a foamed member and a sheet member having a plurality of openings.

More preferably the porous body includes a mesh member prepared by weaving wire to be netlike.

The porous body may be prepared by folding. In that case, the porous body may include a short-side part whose lower end position is relatively high and vertical length is short, and a long-side part whose lower end position is relatively low and vertical length is long, and may be prepared by folding so that the short-side part overlaps with the long-side part and deforming so that the long-side part is located inside of the short-side and along an outer circumferential shape of the valve seat member.

In a further preferable embodiment, the porous body is prepared by aligning positions of an end of the short-side part on an opposite side of the long-side part and an end of the long-side part on an opposite side of the short-side part, and joining.

In a still further preferable embodiment, the porous body is prepared by joining and fixing a part of the long-side part that does not overlap with the short-side part to the valve seat member.

According to the motor-driven valve of the present invention, since a porous body having a cutout corresponding to the first opening disposed at a lateral part of the valve body and extending at least to a part lateral to the valve port is fixed to a valve seat member, when fluid (gas refrigerant) flows in the first flowing direction and in the second flowing direction, the porous body disposed at least at a region including the part lateral to the valve port can suppress vortex flow in the vicinity of the region between the valve port and the inner wall face of the valve body, and the porous body that is fixed to the valve seat member can be assembled to the valve body. Therefore, the motor-driven valve of the present invention, which has a simple configuration, can suppress flow rate loss of fluid and reduce noise generated at the motor-driven valve effectively, without greatly changing a conventional motor-driving valve.

DETAILED DESCRIPTION OF THE INVENTION

The following describes embodiments of a motor-driven valve according to the present invention, with reference to the drawings.

Figure 1:
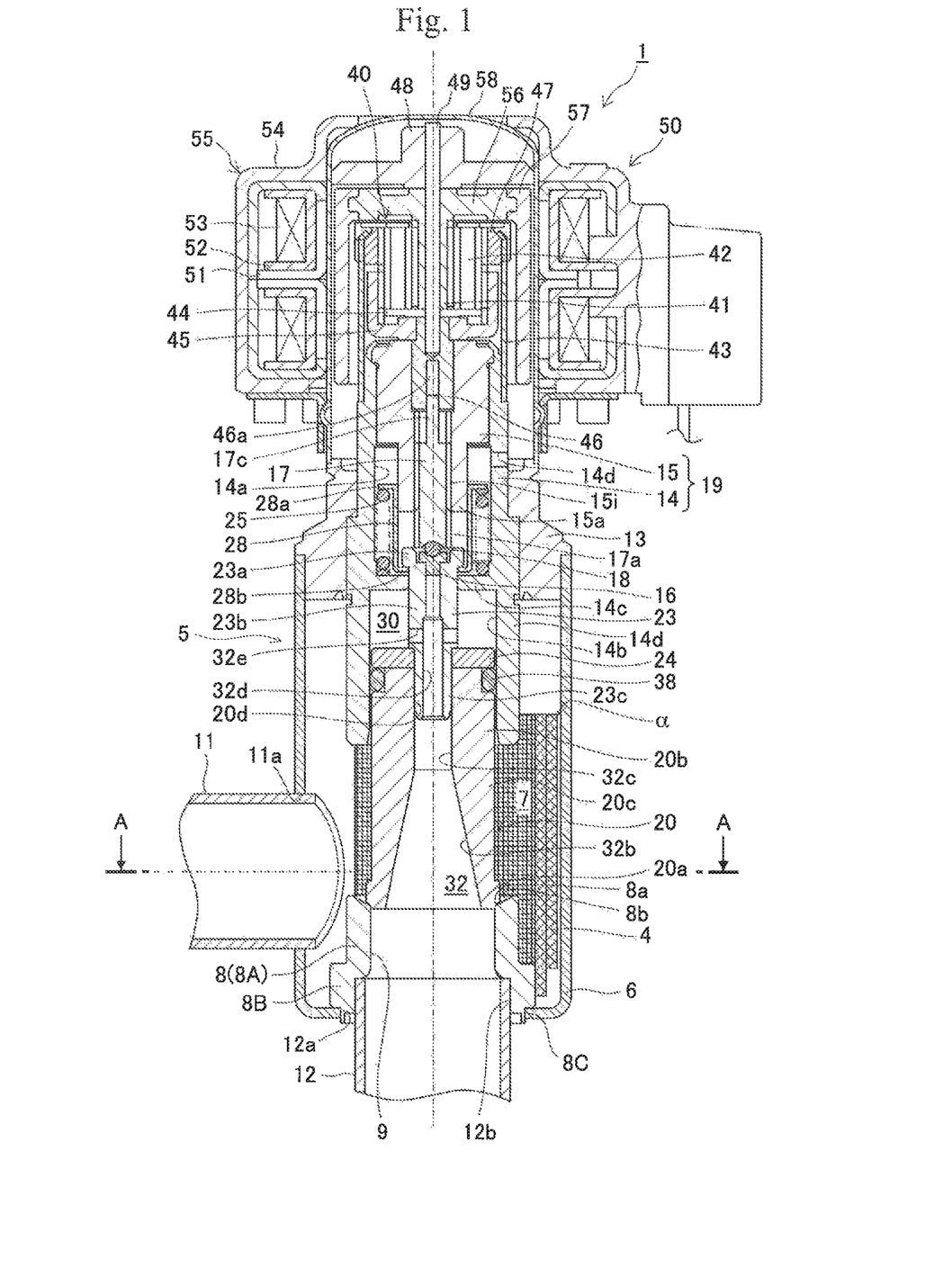
FIG. 1 is a longitudinal sectional view showing one embodiment of a motor-driven valve according to the present invention.
Figure 2:
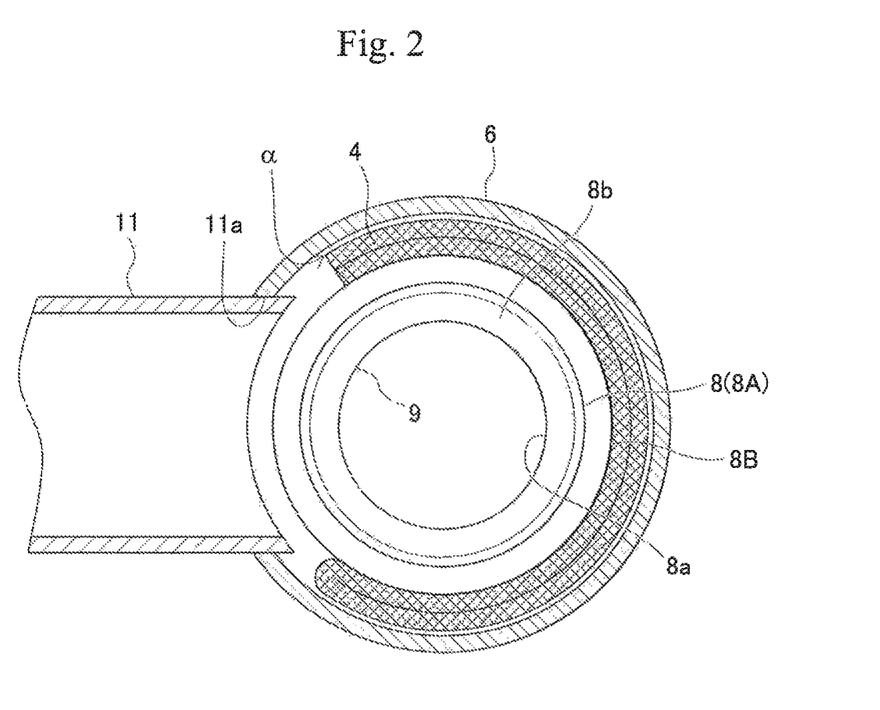
FIG. 2 is a cross-sectional view taken along the line indicated with arrows A-A of FIG. 1.

FIG. 1 is a longitudinal sectional view showing one embodiment of the motor-driven valve according to the present invention, and FIG. 2 is a cross-sectional view taken along the line indicated with the arrows A-A of FIG. 1. Note here that FIG. 2 omits the valve element.

A motor-driven valve 1 in the illustrated embodiment is used as an expansion valve for a heat-pump type heating and cooling system, for example, and is a two-way flowing type motor-driven valve including a flow path in which fluid (refrigerant) flows in two ways (the first flowing direction and the opposite second flowing direction), and a large flow flows in at least one of the directions.

The motor-driven valve 1 mainly includes a valve body 5 having a cylindrical base 6 made of sheet metal, a can 58 fixed to the valve body 5, a supporting member 19 that is fixedly disposed to the valve body 5 in the internal space defined by the valve body 5 and the can 58, a valve element 20 supported by the supporting member 19 and disposed in a vertically ascendable/descendable manner in the internal space, and a stepping motor (vertically driving unit) 50 attached above the valve body 5 so as to make the valve element 20 ascend/descend.

The cylindrical base 6 of the valve body 5 has a valve chamber 7 defined inside thereof, and has a horizontal first opening 11*a* at the lateral part so as to open on the valve chamber 7 and a vertical second opening 12*a* at the bottom part so as to open on the valve chamber 7. To the second opening 12*a* at the bottom part of the cylindrical base 6 of the valve body 5, a stepped circular cylindrical valve seat member 8 is fixed, the valve seat member 8 having a vertical valve port 9 and a valve seat 8*a* that open on the valve chamber 7. Then, to the first opening 11*a* formed at the lateral part of the cylindrical base 6, a horizontal conduit fitting 11 is attached by brazing, for example, and to a connection port 12*b* having a diameter larger than that of the valve port 9 and formed close to a bottom part 8C of the valve seat member 8, a vertical conduit fitting 12 is attached by brazing, for example, so as to communicate with the valve port 9 of the valve seat member 8.

Specifically the valve seat member 8 is made of metal, such as SUS, and has the short circular cylindrical bottom part 8C that is fitted to the second opening 12*a* so as to be fixed to the cylindrical base 6 of the valve body 5, and the conduit fitting 12 is fitted and inserted into the connection port 12b formed close to the bottom part 8C. This valve seat member 8 further has a small-diameter upper part 8A provided with the valve seat 8a and a large-diameter lower part 8B into which the conduit fitting 12 is fitted. At an upper end of the small-diameter upper part 8A of the valve seat member 8, an inclined face 8b is formed to be connected to the valve seat 8a, and the valve seat member 8 and the conduit fitting 11 are arranged so that the upper end part of this inclined face 8b is located substantially in the vicinity of a center of the conduit fitting 11 attached to the first opening 11a or slightly below the center of the conduit fitting 11, and so that the valve seat 8a (upper end of the valve port 9) is located lateral to the conduit fitting 11 attached to the first opening 11a. Then, the outer diameter of the small-diameter upper part 8A of the valve seat member 8 is substantially the same as the outer diameter (of a sleeve part 14d) of a cylindrical holding member 14 of the supporting member 19 described later, and the outer diameter of the large-diameter lower part 8B of the valve seat member 8 is slightly larger than the outer diameter (of the sleeve part 14d) of the cylindrical holding member 14.

To the upper opening of the cylindrical base 6 of the valve body 5, a stepped cylindrical base 13 whose diameter decreases toward the above is attached, and the lower face of the stepped cylindrical base 13 defines the ceiling face of the valve chamber 7. To the upper end of the stepped cylindrical base 13, a lower end of the circular cylindrical can 58 having a ceiling part is joined by welding, for example.

The supporting member 19 has the cylindrical holding member 14 having a partition wall 14c and a bearing member 15 having an internal thread 15i, and the cylindrical holding member 14 is fixed by press-fitting, for example, to the inside of the stepped cylindrical base 13 so that the circular cylindrical sleeve part 14d that is a part below the partition wall 14c protrudes into the valve chamber 7. Then, the internally threaded bearing member 15 that is cylindrical in shape and having the internal thread 15i at a lower part of the inner periphery thereof is fixed by caulking, for example, to the upper part of the cylindrical holding member 14. Herein, a protrusion 15a is formed on the center of the lower face of the internally threaded bearing member 15, and this protrusion 15a also is provided with the internal thread 15i. A spring chamber 14a is defined between the partition wall 14c of the cylindrical holding member 14 and the internally threaded bearing member 15, and the spring chamber 14a stores a valve opening spring 25 to bias the valve element 20 in the valve-opening direction.

The valve element 20 is a cylindrical member in which a pressure equalizing path 32 is formed at the center part thereof along the ascending/descending direction (vertical direction) of the valve element 20, the upper part of the valve element 20 is internally fitted slidably into a valve element guide hole 14b located below the partition wall 14c of the cylindrical holding member 14, and the lower part of the valve element 20 protrudes from (the valve element guide hole 14b of) the cylindrical holding member 14 toward (the valve port 9 of) the valve seat member 8. The valve element 20 has, from the above, an upper circular cylindrical part 20b having a constant inner diameter, and a skirt part 20c having an inner diameter continuously expanding toward the valve port 9 of the valve seat member 8. The center hole of the upper circular cylindrical part 20b is a fitting hole 20d, to which a small-diameter lower part 23c of a thrust transmitting member 23 is fitted and fixed, and the lower end part of the skirt part 20c is a substantially truncated cone-shaped valve element part 20a to open and close the valve port 9 while moving close to and away from the valve seat 8a of the valve seat member 8. The inner diameter of the upper circular cylindrical part 20b and the inner diameter of the upper end part of the skirt part 20c are the same, and therefore the inner periphery of the upper circular cylindrical part 20b is contiguously connected to the inner periphery of the skirt part 20c.

In the present embodiment, the porous body 4 as vortex flow prevention means is fixed to the outer circumference of the large-diameter lower part 8B of the valve seat member 8. This porous body 4 is made of a mesh member prepared by weaving metal wire, such as SUS, to be netlike, and is extended from the outer circumference of the large-diameter lower part 8B to a position that is lateral to the sleeve part 14d of the cylindrical holding member 14 (i.e., the position above the lower end of the sleeve part 14d of the cylindrical holding member 14 and below the ceiling face of the valve chamber 7) beyond the position that is lateral (outside) of the valve port 9 of the valve seat member 8, and has a C-letter shape in transverse section, in which a part corresponding to the first opening 11a is cut along the entire of the ascending/descending direction (vertical direction) of the valve element 20 so as not to prevent the flow of the fluid passing through the inside of the conduit fitting 11 attached to the first opening 11a and the valve chamber 7 (see FIG. 2). In other words, the porous body 4 is disposed in the vertical range from below a part lateral to the valve port 9 of the valve seat member 8 to a part lateral to the sleeve part 14d of the cylindrical holding member 14 and a part below the ceiling face of the valve chamber 7 so as to cover the surrounding of the part of the valve element 20 protruding from (the valve element guide hole 14b of) the cylindrical holding member 14, other than at the part corresponding to the first opening 11a. Herein as mentioned above, the outer diameter of the large-diameter lower part 8B of the valve seat member 8 is larger than the outer diameter of the sleeve part 14d of the cylindrical holding member 14, and therefore the porous body 4 is disposed laterally to the sleeve part 14d of the cylindrical holding member 14 while keeping a distance from the sleeve part 14d. Further, the thickness of this porous body 4 is smaller than the distance between (the outer circumference of) the large-diameter lower part 8B of the valve seat member 8 and (the inner wall face of) the cylindrical base 6, and therefore the porous body 4 is held in the valve chamber 7 so that it has a predetermined gap α with the inner wall face of the cylindrical base 6 of the valve body 5.

Figure 3:
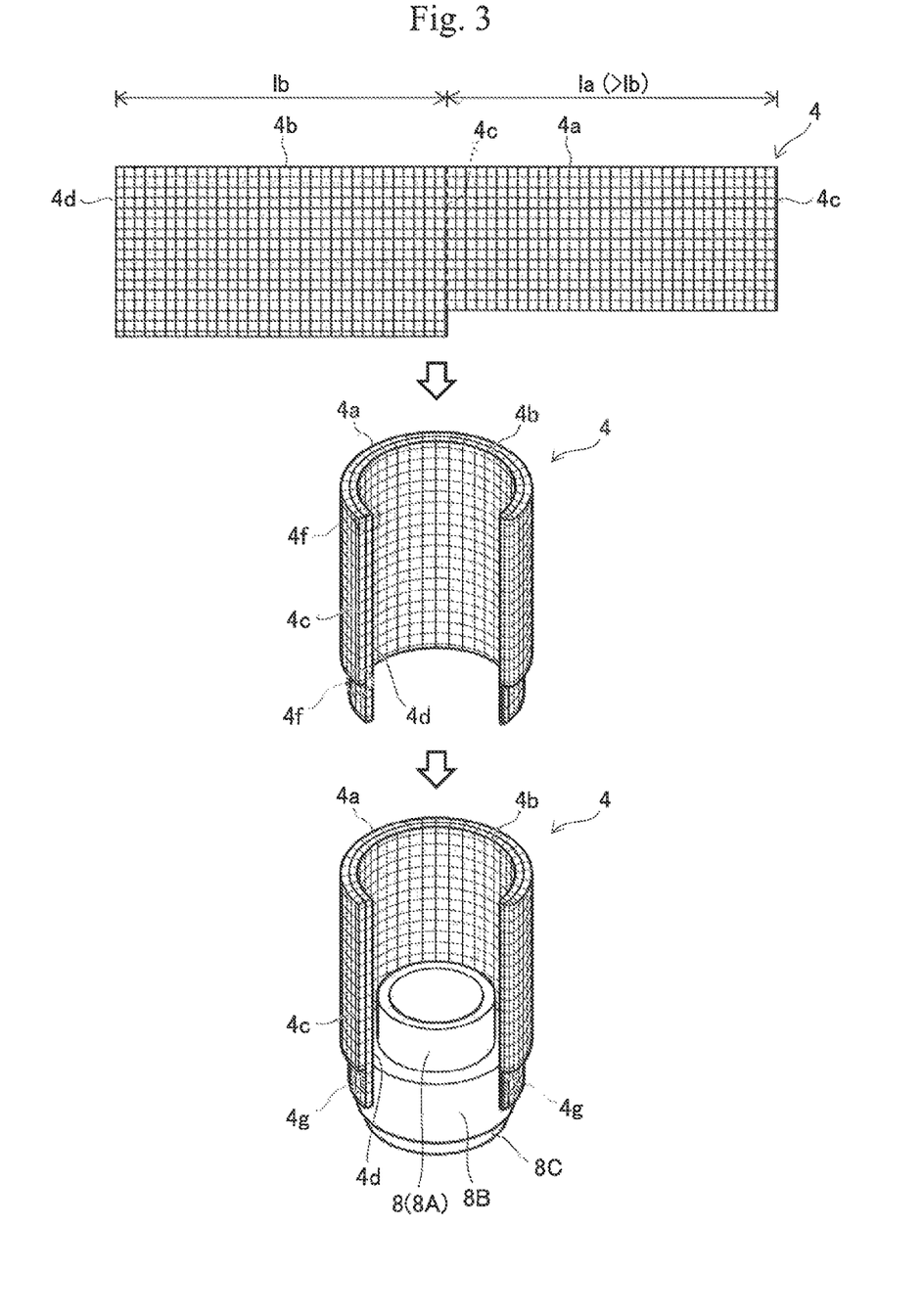
FIG. 3 describes the step of preparing a porous body (mesh member) shown in FIG. 1 and the step of assembling a valve seat member and the porous body.

Specifically, as shown in FIG. 3, the porous body 4 (mesh member) is prepared with a blank made up of a rectangular-sheet shaped short-side part 4a whose lower end position is relatively high and vertical length is short, and a rectangular-sheet shaped long-side part 4b whose lower end position is relatively low and vertical length is long. This blank is folded at a boundary 4c extending vertically that is defined between the short-side part 4a and the long-side part 4b so that the short-side part 4a overlaps with the long-side part 4b, and is deformed into a C-letter shape in transverse section along the outer circumferential shape of the large-diameter lower part 8B of the valve seat member 8 so that the long-side part 4b is located inside of the short-side part 4a, and then the short-side part 4a and the long-side part 4b are joined by welding, for example, whereby the porous body 4 is formed. Herein, the dimensions of the blank are designed so that the short-side part 4a has a lateral length 1a that is slightly longer than a lateral length 1b of the long-side part 4*b*, and when being deformed, an end 4*c* of the short-side part 4*a* on the opposite side of the long-side part 4*b* coincides with an end 4*d* of the long-side part 4*b* on the opposite side of the short-side part 4*a*, and therefore when the positions of the end 4*c* of the short-side part 4*a* and the end 4*d* of the long-side part 4*b* are aligned, and their upper and lower two position are joined (welding parts 4*f*), whereby the shape of the porous body 4 can be held. Then, the lower end part of the porous body 4 that is a part of the long-side part 4*b* that does not overlap with the short-side part 4*a* (not-overlapped part) is externally fitted to the large-diameter lower part 8B of the valve seat member 8, and the not-overlapped part is joined to the outer circumference of the large-diameter lower part 8B of the valve seat member 8 by welding, for example (in the present embodiment, three points including both ends of the porous body 4 having a C-letter shape in transverse section in the circumferential direction and its mid part (not illustrated) are spot-welded, joint parts 4*g*), whereby the porous body 4 is fixed to the valve seat member 8.

To the valve seat member 8 to which the porous body 4 is fixed in this way, the conduit fitting 12 is attached to the valve port 9 thereof, and then the valve seat member 8 is inserted to the inside (i.e., in the valve chamber 7) of the cylindrical base 6 as in letting it drop from the upper opening of the cylindrical base 6, while aligning the cutout part of the porous body 4 having a C-letter shape in transverse section with the conduit fitting 11 attached to the first opening 11*a* of the cylindrical base 6 (the cylindrical base 6, to which the conduit fitting 11 has been attached beforehand), and then the bottom part 8C is fixed to the second opening 12*a* of the cylindrical base 6 by caulking, for example. Thereafter, the cylindrical base 13, to which the aforementioned supporting member 19, the valve element 20, a rotor 57, the can 58 and the like are attached, is joined to the upper opening of the cylindrical base 6 by welding, for example, whereby the motor-driven valve 1 is assembled.

Meanwhile the stepping motor 50 attached above the valve body 5 includes a stator 55 made up of a yoke 51, a bobbin 52, a coil 53, a resin mold cover 54 and the like, and the rotor 57 that is disposed inside of the can 58 and rotatably with respect to the can 58, and that includes a rotor supporting member 56 fixed to the inside of the upper part thereof. The stator 55 is externally fitted and fixed to the can 58. Then, on the inner periphery of the rotor 57, a mechanical paradox planetary gear reduction mechanism 40 is provided, including a sun gear 41 that is integrally formed with the rotor supporting member 56, a fixed ring gear 47 that is fixed to the upper end of a cylindrical member 43 fixed to the upper part of the cylindrical holding member 14, a planetary gear 42 that is disposed between the sun gear 41 and the fixed ring gear 47 and meshes with both of them, a carrier 44 that supports the planetary gear 42 rotatably, a bottomed ring-shaped output gear 45 that meshes with the planetary gear 42 externally, an output shaft 46 whose upper part is fixed to a hole formed at the bottom of the output gear 45 by press-fitting, for example, and the like. Herein, the fixed ring gear 47 has the number of teeth that is different from the number of teeth of the output gear 45.

A hole is formed at the upper center part of the output shaft 46, through which a lower part of a supporting shaft 49 that is inserted into the center part of the sun gear 41 (rotor supporting member 56) and the carrier 44 is inserted. The upper part of this supporting shaft 49 has the outer diameter that is substantially the same as the inner diameter of the can 58, and is inserted into a hole formed at the center part of a supporting member 48 that is disposed in internally contact with the can 58 above the rotor supporting member 56. The rotor 57 itself is configured so as not to move vertically inside of the can 58 due to the supporting member 48 or the like, and the positional relationship thereof with the stator 55 that is externally fitted and fixed to the can 58 is therefore always kept constant.

The lower part of the output shaft 46 of the reduction mechanism 40 is rotatably inserted into the upper part of the internally threaded bearing member 15 making up the supporting member 19 that supports the output shaft 46 or the like, and at the lower part of the output shaft 46, a slit-like fitting part 46*a* is formed so as to pass through the center and extend laterally. A rotary ascending/descending shaft 17 having an external thread 17*a* that threadably engages with the internal thread 15*i* formed on the lower inner periphery of the internally threaded bearing member 15 has a plate-like portion 17*c* so as to protrude at the upper end thereof, and the plate-like portion 17*c* is fitted slidably to the slit-like fitting part 46*a*. As the output shaft 46 rotates with the rotation of the rotor 57, the rotation of the output shaft 46 is transmitted to the rotary ascending/descending shaft 17, and the rotary ascending/descending shaft 17 ascends/descends while rotating due to the thread feeding of the internal thread 15*i* of the bearing member 15 and the external thread 17*a* of the rotary ascending/descending shaft 17.

The thrust transmitting member 23 having a stepped cylindrical shape, to which downward thrust of the rotary ascending/descending shaft 17 is transmitted via a ball 18 and a ball receiving seat 16, is disposed below the rotary ascending/descending shaft 17.

The thrust transmitting member 23 includes, from the above, a large-diameter upper part 23*a*, into an inner periphery of which the ball receiving seat 16 is fitted, an intermediate barrel 23*b* that is slidably inserted into the hole formed at the partition wall 14*c* of the cylindrical holding member 14, and a small-diameter lower part 23*c* having a diameter smaller than the intermediate barrel 23*b*, and internally includes a vertical through hole 32*d* making up the upper part of the pressure equalizing path 32 formed in the valve element 20 and a plurality of transverse holes 32*e* that opens on a back pressure chamber 30 described later. Note here that the upper end opening of the through hole 32*d* is blocked with the ball receiving seat 16.

The small-diameter lower part 23*c* of the thrust transmitting member 23 is fitted and fixed to the fitting hole 20*d* of the upper circular cylindrical part 20*b* of the valve element 20 by press-fitting, for example, so that the valve element 20 and the thrust transmitting member 23 integrally ascend and descend. Herein, a retaining member 24 is sandwiched and fixed between the upper end face of the valve element 20 and the lower-end step height of the intermediate barrel 23*b* of the thrust transmitting member 23 when the small-diameter lower part 23*c* is press-fitted, and a seal member 38, such as an O ring, is attached between an annular groove formed with this retaining member 24 and the upper end of the valve element 20 and the valve element guide hole 14*b*.

As described above, the spring chamber 14*a* above the partition wall 14*c* of the cylindrical holding member 14 stores the valve opening spring 25 that is a compression coil spring so that the lower end of the spring comes into contact with the partition wall 14*c*, as well as a lifting spring receptacle 28 so as to transmit the biasing force (lifting force) of this valve opening spring 25 to the valve element 20 via the thrust transmitting member 23, the lifting spring receptacle 28 having upper and lower hook parts 28*a* and 28*b* like a flange. The upper hook part 28*a* of the lifting spring receptacle 28 is placed above the valve opening spring 25, and the lower hook part 28b is hooked to the lower-end step height of the large-diameter upper part 23a of the thrust transmitting member 23. Then, the cylindrical holding member 14 has a communication hole 14d formed so as to allow the communication between the spring chamber 14a and the inside of the can 58.

Therefore, when the rotor 57 of the motor 50 is rotary driven in one direction, the rotation of the rotor 57 is transmitted to the rotary ascending/descending shaft 17 in a deceleration manner via the output shaft 46 of the reduction mechanism 40, the rotary ascending/descending shaft 17 descends, for example, while rotating due to thread feeding between the internal thread 15i of the internally threaded bearing member 15 and the external thread 17a of the rotary ascending/descending shaft 17, and the thrust transmitting member 23 and the valve element 20 are pressed down by the thrust of the rotary ascending/descending shaft 17 against the biasing force of the valve opening spring 25, so that the valve element part 20a that is the lower end part of the skirt part 20c of the valve element 20 is finally seated on the valve seat 8a so as to close the valve port 9 (see FIG. 1). On the contrary, when the rotor 57 of the motor 50 is rotary driven in the other direction, the rotation of the rotor 57 is transmitted to the rotary ascending/descending shaft 17 in a deceleration manner via the output shaft 46 of the reduction mechanism 40, the rotary ascending/descending shaft 17 ascends, for example, while rotating due to thread feeding between the internal thread 15i and the external thread 17a, and the thrust transmitting member 23 and the valve element 20 are accordingly lifted by the biasing force of the valve opening spring 25, so that the valve element part 20a is separated from the valve seat 8a so as to open the valve port 9.

Further the back pressure chamber 30 is defined above the valve element 20 and between the retaining member 24 and the partition wall 14c of the cylindrical holding member 14. In the valve element 20, the pressure equalizing path 32 is formed so as to allow the communication between the lower end of the valve element 20 and the back pressure chamber 30, including, from the below, a thick path 32b having the inner periphery face of the skirt part 20c whose lower end opens toward the valve port 9, and a thin path 32c (fitting hole 20d) having the inner periphery face of the upper circular cylindrical part 20b, and the thin path 32c communicates with the back pressure chamber 30 via the through hole 32d and the transverse holes 32e of the thrust transmitting member 23. Herein, for balancing (canceling the different pressure) between the pressing-down force (force acting in the valve-closing direction) acting on the valve element 20 and the lifting force (force acting in the valve-opening direction) acting on the valve element 20 in the valve closed state, the diameter of the back pressure chamber 30 and the diameter of the valve port 9 are set substantially the same.

When the rotor 57 of the motor 50 in the thus configured motor-driven valve 1 is rotary driven in the other direction to open the valve port 9, fluid (refrigerant) flows in the first flowing direction (the direction from the conduit fitting 11 connected to the first opening 11a to the conduit fitting 12 connected to the valve seat member 8 of the second opening 12a) and in the opposite second flowing direction. Herein, if refrigerant as gas (gas refrigerant) in a gas excessive state flows in the first flowing direction and in the second flowing direction, the porous body 4 having a C-letter shape in transverse section that is disposed at least in a region including a part lateral to the valve port 9 of the valve seat member 8 functions so as to eliminate the periodicity of vortex flow that occurs in the region between the valve port 9 and the inner wall face of the valve body 5 (especially, when the refrigerant flows in the first flowing direction, in the region between the lateral part of the valve port 9 and the inner wall face of the valve body 5 when the valve chamber 7 is viewed from the first opening 11a, and when the refrigerant flows in the second flowing direction, in the region between the part of the valve port 9 on the opposite side of the first opening 11a and the inner wall face of the valve body 5, especially in a region close to the valve port 9 of that region), and to suppress the vortex flow in such a region, whereby noise generated at the motor-driven valve 1 can be reduced.

Especially, the experiment by the present inventors showed that, in the structure of the present embodiment, a part of the valve element 20 protrudes (is exposed) from (the valve element guide hole 14b of) the cylindrical holding member 14, and the valve element 20 vibrates due to vortex flow generated around the exposed part of the valve element 20, and this vibration is transmitted to other components connected to the valve element 20 so that resonance occurs, and the noise increases accordingly. The porous body 4 described above, however, is extended from below a part lateral to the valve port 9 to a part lateral to the sleeve part 14d of the cylindrical holding member 14 and below the ceiling face of the valve chamber 7 of the valve body 5, and therefore vortex flow can be suppressed in the vicinity of the exposed part of the valve element 20, and the resonance phenomenon as described above can be prevented reliably, so that noise generated at the motor-driven valve 1 can be reduced effectively.

Specifically the experiment by the present inventors showed that, when refrigerant in the gas excessive state flowed in the first flowing direction, vortex flow (see FIG. 5) disappeared reliably, which generated at the conventionally structured motor-driven valve when the pulse energization amount to the stepping motor 50 of the motor-driven valve 1 was changed from 150 pulses to 300 pulses in the state where the difference pressure between the conduit fitting 11 and the conduit fitting 12 was high (about 0.7 to 2.0 MPa).

In the motor-driven valve 1 of the present embodiment, the porous body 4 is fixed to the outer circumference of the valve seat member 8 having a predetermined gap $\alpha$ with the inner wall face of the valve body 5. Therefore, the porous body 4 may be fixed to the valve seat member 8 by welding, for example, beforehand, whereby the motor-driven valve 1 can be assembled easily with the procedure similar to that of the conventional motor-driven valve. The porous body 4 is disposed having a distance from the sleeve part 14d of the cylindrical holding member 14 as well, and with this configuration also, the assembly step of the motor-driven valve 1 can be simplified.

The motor-driven valve 1 of the present embodiment includes, as the porous body 4 as vortex flow prevention means, a mesh member that is prepared by weaving metal wire to be netlike, which is a blank. The blank made up of the short-side part 4a and the long-side part 4b is then folded so that the short-side part 4a overlaps with the long-side part 4b while deforming it so that the long-side part 4b is located inside of the short-side part 4a, and a part of the long-side part 4b that does not overlap with the short-side part 4a is joined to the valve seat member 8 for fixing. Therefore, parameters required to be managed when joining the porous body (mesh member) 4 to the valve seat member 8 can be managed easily, and so with this configuration also, the manufacturing process of the motor-driven valve 1 can be simplified. That is, when the porous body 4 and the valve seat member 8 are joined by resistance welding, for example, the part of the long-side part 4b that does not overlap with the short-side part 4a is joined to the valve seat member 8, whereby the parameters, such as a pressing force of the electrode to the porous body 4 and the valve seat member 8 and a current value, can be managed easily.

Of course, for the porous body 4, a blank may be used as it is without folding, and when it is folded, the blank may be a simple rectangular shape having the same dimension of the lateral both ends, instead of the shape shown in FIG. 3, and this blank may be folded and be attached to the valve seat member 8. That is, in this case, the part that is folded to be double is joined to the valve seat member 8. A method for joining may be any method other than resistance welding.

In the above-mentioned embodiment, a mesh member prepared by weaving metal wire to be netlike is used as the porous body 4 as the vortex flow prevention means. Instead of the mesh member, a foamed member made of metal, a punching metal made of a metal sheet (sheet member) having a plurality of openings, a metal sheet (sheet member) including a plurality of openings formed by photoetching, and the like may be used, and a combination thereof may be used. In the above-mentioned embodiment, a laminate is prepared by folding a sheet of mesh member, and a laminate including the layer of a plurality of mesh members may be used. The porous body 4 may be made of ceramic or resin, for example, instead of metal. The porous body 4 may be prepared by folding the foamed member and the metal sheet (sheet member), or the porous body 4 may be prepared by folding the laminate including the layer of a plurality of mesh members.

In the above-mentioned embodiment, the valve element 20 has the skirt part 20c whose inner diameter is increased toward the valve port 9 of the valve seat member 8, and the internal shape, for example, of the valve element 20 can be changed as needed, and for example, the valve element 20 may have a fixed inner diameter in the vertical direction.

The motor-driven valve of the present embodiment is described to be used as an expansion valve in a heat-pump type heating and cooling system, for example, that is a two-way flowing type motor-driven valve in which fluid flows in two ways, and the motor-driven valve of the present invention is applicable to systems other than such a heat-pump type heating and cooling system or to a motor-driven valve in which fluid flows in only one direction as well.

DESCRIPTION OF SYMBOLS

1 Motor-driven valve
4 Porous body
5 Valve body
6 Cylindrical base
7 Valve chamber
8 Valve seat member
8A Small-diameter upper part
8B Large-diameter lower part
8C Bottom part
8a Valve seat
9 Valve port
11 Conduit fitting
11a First opening
12 Conduit fitting
12a Second opening
13 Cylindrical base
14 Cylindrical holding member
14c Partition wall
14d Sleeve part
15 Cylindrical bearing member
15i Internal thread
17 Rotary ascending/descending shaft
17a External thread
19 Supporting member
20 Valve element
20a Valve element part
40 Mechanical paradox planetary gear reduction mechanism
50 Stepping motor (vertically driving unit)
55 Stator
57 Rotor
58 Can

What is claimed is:

1. A motor-driven valve comprising:
    a valve body having a valve chamber defined internally, and having a lateral part and a bottom part in which a first opening and a second opening are disposed, respectively;
    a valve seat member having a valve port that opens on the valve chamber and a valve seat, the valve seat member being disposed at the second opening of the valve body;
    a valve element disposed in a vertically ascendable/descendable manner in the valve chamber; and a vertically driving unit that makes the valve element ascend/descend with respect to the valve seat,
    wherein a porous body is fixed to the valve seat member, the porous body being extended at least to be lateral to the valve port and having a cutout part corresponding to the first opening, and
    wherein the porous body includes a short-side part and a long-side part, the short-side part defines first vertical length and the long-side part defines a second vertical length, the first vertical length dimensioned smaller than the second vertical length, and
    wherein the short-side part overlaps with the long-side part and the long-side part is located inside of the short-side part and along an outer circumferential shape of the valve seat member.

2. The motor-driven valve according to claim 1, wherein:
    a cylindrical holding member is fixed to the valve body, the cylindrical holding member having a sleeve part that slidably holds the valve element that is internally fitted to the sleeve part and partly penetrates from the sleeve part, and
    the porous body is extended to a position that is lateral to the sleeve part of the cylindrical holding member and below a ceiling face of the valve chamber of the valve body.

3. The motor-driven valve according to claim 2, wherein the porous body is disposed having a distance from the sleeve part of the cylindrical holding member.

4. The motor-driven valve according to claim 1, wherein the porous body includes at least one of a mesh member prepared by weaving wire to form a net, a laminate including the layer of a plurality of the mesh members, a foamed member and a sheet member having a plurality of openings.

5. The motor-driven valve according to claim 4, wherein the porous body includes a mesh member prepared by weaving wire to form a net.

6. The motor-driven valve according to claim 1, wherein the porous body is prepared by folding.

7. The motor-driven valve according to claim 6, wherein the short-side part of the porous body is joined to the long-side part at a boundary, the short-side part defines a first lateral length, and the long-side part defines a second lateral length, the first lateral length dimensioned greater than the second lateral length.

8. The motor-driven valve according to claim 7, wherein the porous body is prepared by aligning positions of an end of the short-side part on an opposite side of the long-side part and an end of the long-side part on an opposite side of the short-side part, and joining.

9. The motor-driven valve according to claim 7, wherein the porous body is prepared by joining and fixing a part of the long-side part that does not overlap with the short-side part to the valve seat member.

10. The motor-driven valve according to claim 1, wherein the cutout part of the porous body extends along an entire vertical height of the porous body.

11. The motor-driven valve according to claim 1, wherein the cutout part of the porous body extends along the entire first and second vertical lengths of the short-side and long-side parts.

12. The motor-driven valve according to claim 1, wherein the porous body defines a C-shaped shape.

* * * * *